March 26, 1957 R. E. BOONE ET AL 2,786,553
FLUID PRESSURE CONTROLLED GEAR BRAKE
Filed Jan. 11, 1954
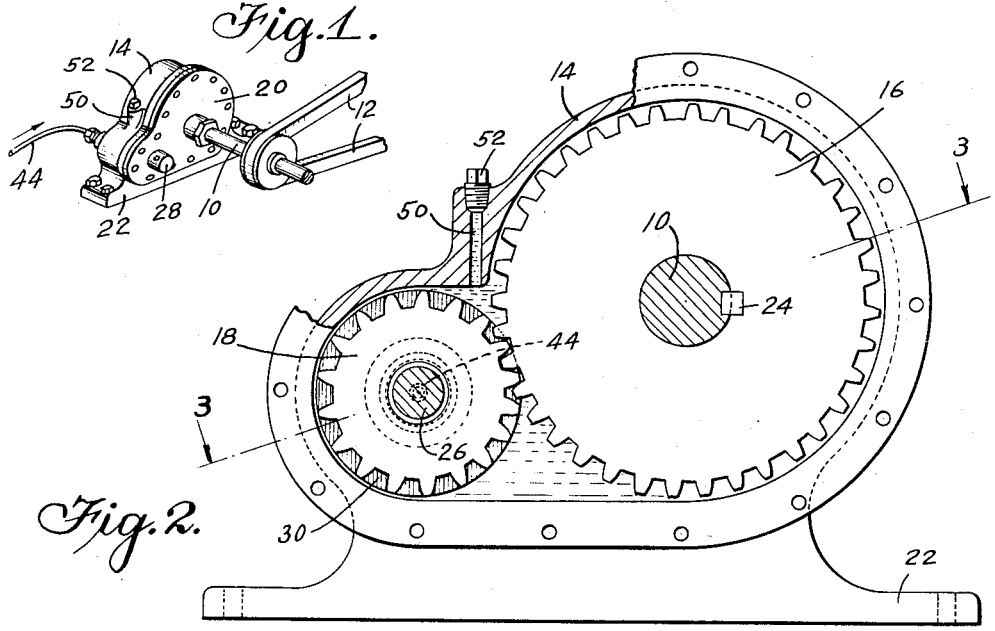
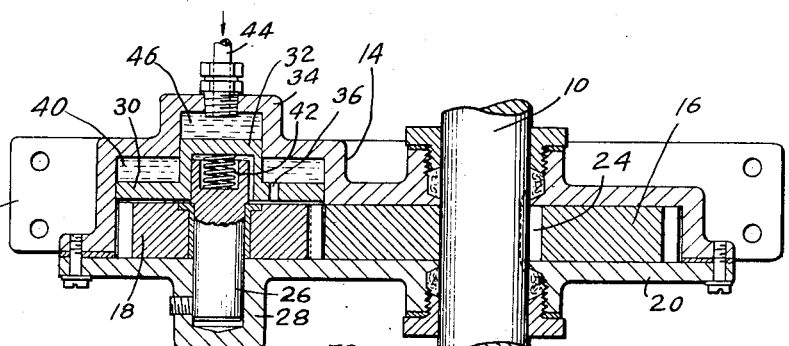
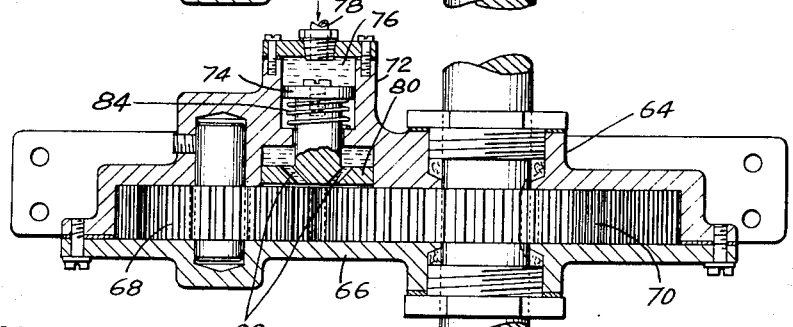
INVENTORS.
Ronald E. Boone.
BY Clifford H. Aldrich.
ATTORNEY.

United States Patent Office 2,786,553
Patented Mar. 26, 1957

2,786,553

FLUID PRESSURE CONTROLLED GEAR BRAKE

Ronald E. Boone, San Fernando, and Clifford H. Aldrich, Burbank, Calif., assignors of one-eighth to Wilford E. Beattie and one-eighth to Joan Herod Vanvoorhees, Burbank, Calif.

Application January 11, 1954, Serial No. 403,113

1 Claim. (Cl. 188—92)

This invention relates to an improved gear brake, and has for one of its principal objects the provision of a braking device which can be used to control the speed or motion of any mechanism, and which is particularly desirable in connection with automotive vehicles and the like.

One of the important objects of this invention is to provide an improved hydraulic brake which is so constructed that a pair of co-operating gears are mounted in the casing, filled with a liquid such as oil or the like, and wherein a control means is provided for regulating the amount of liquid which circulates in and around the gears.

It is a further object of the invention to mount one of the gears upon the vehicle wheel or axle for continuous rotation therewith, in combination with a casing or pump housing which forces the surrounding fluid to circulate and thereby to provide a retarding effect upon the wheel, axle, or other rotating or moving mechanism.

Yet another object of the invention is the provision of a control means which is completely novel, fully operative, and capable of ready manipulation.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the gear brake of this invention showing the same as applied to any representative rotating mechanism, and illustrating a hydraulic control means.

Figure 2 is a vertical showing of the improved fluid gear brake with one cover removed to illustrate the interior construction.

Figure 3 is a sectional view taken on the line 3—3 of Figure 2, showing more particularly the pressure operated control means.

Figure 4 illustrates a slightly modified form of the control means for the novel gear brake of this invention.

As shown in the drawings:

The reference numeral 10 indicates generally a rotating shaft upon which the improved gear brake of this invention is adapted to be mounted. It will be understood that this rotating shaft may be part of a machine driven by a belt 12, or may be the axle of a vehicle such as an automobile or a truck, or may embody any type of rotatable power operating device, the movement and speed of which is desired to be controlled by the construction of this invention.

A housing 14 is adapted to enclose the gears 16 and 18, and the housing is provided with a removable cover 20. The entire apparatus is shown as mounted upon a base or support 22, but obviously this may take any desired form, such as a portion of an automobile or other representative mechanism.

The gears 16 and 18 are in mesh, as best shown in Figure 2, and the gear 16 is keyed to the shaft 10 at 24. The gear 18 is rotatably mounted on a stub shaft 26 fitted into a boss or the like 28 forming part of the cover 20, and suitable oil seals and packings are provided in the housing and cover to insure against leakage of the contained liquid or brake fluid.

The gear 16 is fitted rather closely into the space between the casing 14 and its cover 20, and a recess is provided in the casing 14 opposite the gear 18, into which recess is slidably fitted a piston-like element 30 provided with an integral head portion 32 which slides in the interior hollowed out portion of an integral boss 34 which is a part of the housing 14, as best illustrated in Figure 3.

An opening 36 is provided in the plate-like portion 30 of the piston element 30—32, providing for the free passage of the brake fluid or other liquid 40 from one side of the piston plate 30 to the other, depending upon the position of this plate in its recess in the casing 14. A helical spring 42 is fitted into the inner end of the stub shaft 26, whereby the piston element 30—32 is normally impelled into a retracted or outermost position with respect to the gear 18 and the containing recess 34.

Fitted into an opening in the outer face of the boss 34 is a tube or pipe 44 which carries a separate supply of hydraulic fluid or the like 46. The pressure on this fluid is either manually or mechanically controlled, as for example the ordinary foot pedal comprising the brake means of a representative automobile or truck.

A refill opening 50 is drilled into the casing 14 and closed by a removable plug 52 as illustrated in Figure 2.

In operation, the piston-like valve element 30—32 is normally in outmost position due to the pressure of the spring 42, and the gear 16 is keyed to the shaft 10. When the shaft 10 is turning, the gear 16 can therefore freely rotate in the housing 14—20 carrying with it the gear 18. The liquid between the gears and in the space beneath the piston plate 30 can freely circulate so long as the piston 30—32 is in its outermost or retracted position, and there will be little or no drag or resistance with regard to the turning of the gears 16 and 18.

However, when pressure is applied in the tube 44 and its contained liquid 46, as indicated by the arrows in Figures 1 and 3, the piston 30—32 is moved inwardly against the action of the spring 42, restricting the space in which the brake fluid or liquid can circulate, and causing more or less resistance to free turning of the gear 18 and the gear 16 which is in mesh therewith. The more constricted the space between the piston plate 30 and the gear 18, the more will be the resistance to turning of the gears in the housing, and if the space is reduced to a minimum or zero, the turning of the gears and the shaft 10 will be correspondingly reduced to a minimum or a zero.

In the modification illustrated in Figure 4, a housing 64 is provided, closed by a cover 66, and having contained gears 68 and 70. An integral boss 72 forms part of the housing 64, this boss being located opposite the point of enmeshing or entrainment of the gears 68 and 70.

A piston 74 moves in the boss 72, and hydraulic fluid 76 enters the boss through a control pipe or tube 78.

The piston is provided with an integral larger lower plate 80 moving in an enlargement of the boss 72, this plate being provided with fluid release passages 82. A control spring 84 is fitted beneath the head 74 of the piston.

The action of the fluid control in this embodiment is substantially the same as that previously described, and will be readily understood by those skilled in the art.

Fluid will pass from one side of the piston plate 80 to the other side, depending on the movement of the head 74 and this is controlled by the other fluid in the tube 78 and the action of the spring 84. If the plate 80 is moved away from the gears 68 and 70 by the spring 84, correspondingly greater freedom of turning movement of the gears will be permitted.

It will be evident that herein is provided a gear brake which is simple, efficient, composed of a minimum number of parts and therefore not likely to get out of order at any time. There is no brake band or drum which are subject to undesirable wear and failure of which often causes serious accidents. Circulation of the fluid round the gears or through a control pipe is either eliminated or reduced to a minimum, whereby undue heating of the mechanism is avoided, and when the device is used on an automobile or the like, one of these gear brakes can readily be mounted on each wheel, whereby hydraulic pressure when applied will be equal throughout the system, facilitating proper control of the car and causing much less wear with resultant greater efficiency and safety.

We are aware that many changes may be made and numerous details of construction varied throughout a wide range without departing from the principles of this invention, and we therefore do not purpose limiting the patent granted hereon otherwise than as necessitated by the prior art.

We claim as our invention:

A gear brake comprising a housing, a rotatable shaft fitted in the housing, a gear keyed to the shaft, another gear in the housing in mesh with the first gear, a shaft for the second gear also in the housing, a liquid in the housing surrounding the gears, means in the housing for controlling the amount of liquid circulating about the gears, said control means comprising a piston, an integral hollow boss in the housing for the slidable reception of the piston, additional space in the boss for a second control liquid beyond the piston, a control means for the second liquid fitted into the outer end of the boss, a spring for normally maintaining the piston in outermost or brake release position, said spring mounted beneath the piston head and in a recess in the shaft which supports the second gear, liquid by-pass means in the piston, the movement of the piston being parallel to the axes of the gear supporting shafts.

References Cited in the file of this patent

UNITED STATES PATENTS

| | | |
|---|---|---|
| 1,257,565 | Weston | Feb. 26, 1918 |
| 1,507,104 | Bradburn et al. | Sept. 2, 1924 |
| 1,770,796 | Mills | July 15, 1930 |
| 1,891,793 | Kauffman | Dec. 20, 1932 |
| 2,086,277 | McCleary | July 6, 1937 |
| 2,108,787 | Coles et al. | Feb. 22, 1938 |